United States Patent [19]

Bailey et al.

[11] 4,073,563
[45] Feb. 14, 1978

[54] STRUCTURE FOR ELECTRICAL CONNECTIONS AND PANEL ASSEMBLY

[75] Inventors: James R. Bailey, Chicago; Vernon W. Lavigne, Rolling Meadows, both of Ill.

[73] Assignee: Switchcraft, Inc., Chicago, Ill.

[21] Appl. No.: 677,223

[22] Filed: Apr. 15, 1976

Related U.S. Application Data

[63] Continuation-in-part of Ser. No. 520,927, Nov. 5, 1974, abandoned.

[51] Int. Cl.² ............................ H01R 9/16; H02B 1/02
[52] U.S. Cl. .................................... 339/128; 339/134; 339/192 R; 339/198 GA
[58] Field of Search .............. 339/126, 128, 132, 134, 339/125, 191, 192, 198 R, 198 G, 198 GA; 248/27.1, 27.3

[56] References Cited

U.S. PATENT DOCUMENTS

| | | | |
|---|---|---|---|
| 848,902 | 4/1907 | Hartley et al. | 339/191 R |
| 1,365,152 | 1/1921 | Burton | 339/134 |
| 1,841,736 | 1/1932 | Jones | 339/191 R |
| 1,918,126 | 7/1933 | Peterson | 339/191 R |
| 2,091,773 | 8/1937 | Travers | 339/134 |
| 2,314,671 | 3/1943 | Vecchio | 339/191 A |
| 2,450,873 | 10/1948 | Antony, Jr. | 339/134 |
| 3,398,249 | 8/1968 | Dessert | 339/134 |
| 3,645,353 | 2/1972 | Cope et al. | 339/128 |
| 3,799,483 | 3/1974 | Chiappinelli | 248/27.3 |

*Primary Examiner*—Joseph H. McGlynn
*Assistant Examiner*—Neil Abrams
*Attorney, Agent, or Firm*—Richard L. Johnston

[57] ABSTRACT

The invention provides a modular structure for electrical connections with an integral molded frame wherein a forward portion of the frame has holes to receive electrical conductors and a rearward portion carries one or more electrical contact assemblies, said frame being adapted to fit into the rear of a panel, with or without elimination of screws previously used for panel mounting, and with the elimination of separate sleeves that have to be brazed on the jack frame, thereby reducing manual operations and simplifying manufacture while providing versatile modular components especially useful in telephone switchboards and apparatus, multiplex and microwave systems, television and broadcast equipment and other control panel applications where small size and reliability are prime engineering and operating parameters. Other features are the provision of a new extruded panel, and the provision of a special type of jack sleeve made from a wrapped up stamping.

13 Claims, 47 Drawing Figures

STRUCTURE FOR ELECTRICAL CONNECTIONS AND PANEL ASSEMBLY

RELATED APPLICATION

This application is a continuation-in-part of United States application Ser. No. 520,927, filed Nov. 5, 1974, now abandoned.

BACKGROUND

It is well known in the art to provide jack and switch frames which are mounted in panels and held in such panels by means of screws. The panels may contain designation strip assemblies which hide the mounting screws, for example, as shown in U.S. Pat. No. 3,597,867.

In structures of this type the switch frames carrying electrical contact assemblies are usually made of metal which is bent in an L-shaped form and secured by means of screws or other fastening means to a plastic module adapted to be inserted in an opening from the rear of the panel. The plastic module also contains openings to receive separate sleeves that are brazed onto or otherwise fastened onto the L-shaped frames. These sleeves are adapted to receive electrical plugs or other types of electrical units such as pilot lamps or the like which, when inserted through the sleeves, are received by one or more assemblies of contact blades usually mounted on the rear portion of the frame by means of screws.

The manufacture of units of the type described involves a number of separate operations and the insertion of these units in panels normally requires relatively small screws that are difficult to handle.

It would, therefore, be desirable to provide new and improved modular jack structures with the elimination of costly manufacturing steps. There is also a need for frame and switch assemblies which can be mounted in a panel without the necessity for using screws or other similar type devices in order to secure the frame and switch assembly in the panel, but which can also be mounted in a panel with screws, if it is desired to do so.

OBJECTS

One of the objects of the present invention is to provide modular structures for electrical connections with an integral molded frame which can be mounted in a panel merely by snapping them into the rear of the panel with the elimination of screws previously used for panel mounting, but which can also be mounted in a panel with screws, if it is desired to do so.

Another object of the invention is the provision of an electrical jack structure which eliminates separate sleeves that have to be brazed on the frame.

Still a further object of the invention is to provide a new and improved frame structure for making electrical connections wherein the entire frame is a molded rigid frame made from plastic or other suitable electrically insulating material having a forward portion adapted to be panel mounted and a rearward portion adapted to receive electrical contact assemblies.

Other objects and advantages of the invention will appear from the following description in conjunction with the accompanying drawings.

BRIEF SUMMARY OF THE INVENTION

The invention provides a modular structure for electrical connections with an integral molded frame wherein a forward portion of the frame has holes to receive electrical conductors and a rearward portion carries one or more electrical contact assemblies, said frame being adapted to fit into the rear of a panel, with or without elimination of screws previously used for panel mounting, and with the elimination of separate sleeves that have to be brazed on the frame thereby reducing manual operations and simplifying manufacture while providing versatile modular components especially useful in telephone switchboards and apparatus, multiplex and microwave systems, television and broadcast equipment and other control panel applications where small size and reliability are prime engineering and operating parameters. Other features are the provision of a new type of extruded panel, and the provision of a special type of jack frame made from a wrapped up stamping.

DETAILED DESCRIPTION OF THE INVENTION

Figure 1:
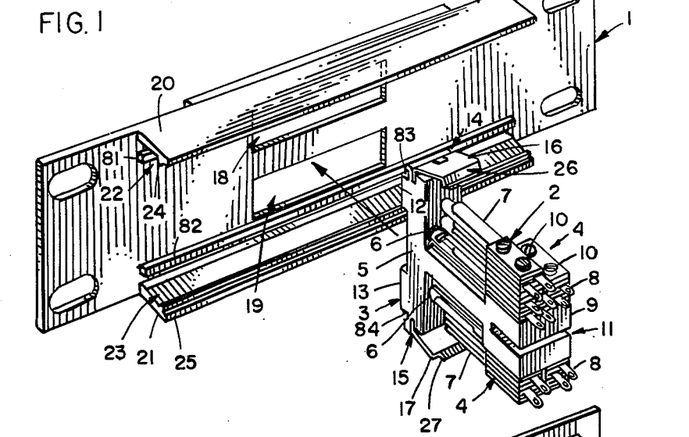
FIG. 1 is an exploded perspective view illustrating a frame assembly and a panel adapted to receive said assembly representing one embodiment of the invention.

As shown in FIG. 1, one feature of the invention involves the combination of a panel 1 with an assembly 2 comprising a molded frame 3 made of an electrically insulating material and having mounted thereon one or more electrical contact assemblies 4. The frame 3 comprises a forward portion 5 with one or more holes therein 6 adapted to receive plugs, switches, pilot lights or other electrical fixtures, rearwardly extending portions of which support contact electrical contact blades 7. The ends of electrical contact blades 7 have terminals 8 which are connected to suitable electrical circuitry. The electrical contact assemblies 4 are mounted on the rear portion 9 of frame 3 by means of screws 10. A recess or space 11 is provided to separate the upper and lower contact assemblies. The forward portion 5 of frame 3 has a pair of outwardly extending faces 12 and 13. The upper and lower ends of forward portion 5 of frame 3 also contain recesses 14 and 15 in which are mounted resilient clips 16 and 17.

Panel 1 contains in the face thereof two openings 18 and 19 which are adapted to receive the forwardly projecting faces 12 and 13, respectively, of the forward portion 5 of frame member 3. Panel 1 also contains rearwardly extending members 20 and 21 on the upper and lower sides thereof respectively, said members containing channels or recesses 22 and 23, the sides of which form projections 24 and 25 that are adapted to receive and engage the ends 26 and 27 of resilient clips 16 and 17 when frame member 3 is combined with panel 1 by bringing panel 1 and frame member 3 together with faces 12 and 13 of frame 3 inserted in openings 18 and 19 of panel 1 and resilient clips 16 and 17 pressing against the interior sides of the rearwardly extending portions 20 and 21 of panel 1 so that the rear portions 26 and 27 of clips 16 and 17 assume a latched position with respect to the channel areas 22 and 23 and the projecting portions 24 and 25 of panel 1, respectively.

Figure 2:
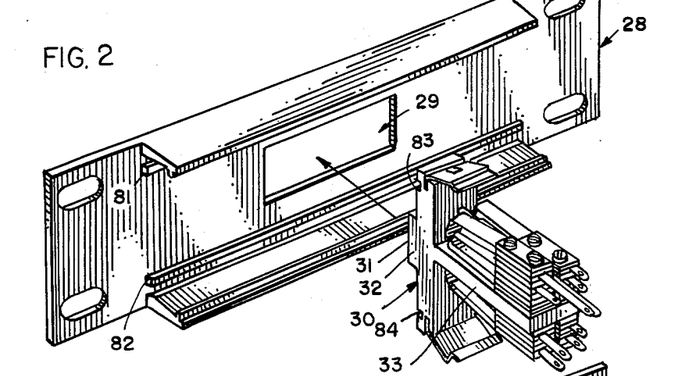
FIG. 2 is an exploded perspective view illustrating a modification of the invention shown in FIG. 1.

The structure shown in FIG. 2 is generally similar to that shown in FIG. 1 except that the panel 28 has a single opening 29 in the face thereof and the frame 30 has a single projecting portion 31 adapted to be received by openings 29. As in the embodiment shown in FIG. 1 the forward portion 32 of frame 30 is made of an electrically insulating material and integrally molded with the horizontal rearward portion 33 but the structure is somewhat different as described in detail hereinafter.

Figure 3:
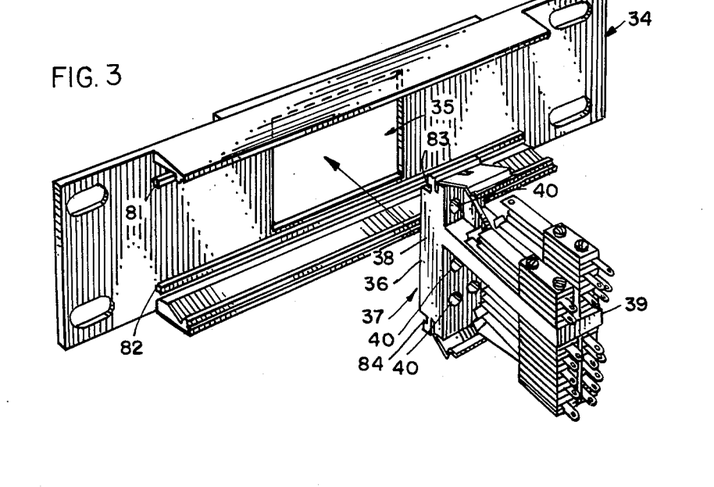
FIG. 3 is an exploded perspective view illustrating a modification of the inventions shown in FIGS. 1 and 2.

In the embodiment illustrated in FIG. 3 the structure is generally similar to that described with respect to FIG. 1 except that the panel 34 contains only a single opening 35 and the forward face 36 of frame 37 is adapted to be received by the opening 35. As in the embodiment shown in FIG. 1 the forward portion 38 of frame 37 is molded from an electrically insulating material and is integral with the horizontally extending portion 39. The specific arrangement of holes 40 is also different from that in the embodiment shown in FIG. 1.

FIGS. 4 to 9 illustrate in detail the structure of the frame member 3 of the embodiment shown in FIG. 1 wherein the frame member 3 made of plastic or other suitable moldable electrically insulating material comprises holes 6 in the forward portion thereof 5 and contains forwardly extending faces 12 and 13 and a horizontal rearwardly extending portion 9 on which electrical contact assemblies are adapted to be mounted by means of internally threaded metal inserts 41 which are molded into the frame 3. The inserts 41 are adapted to receive the screws 10 used in mounting the electrical contact blades. The recesses 14 and 15 which are molded into frame member 3 are adapted to receive the resilient clips 16 and 17. It will be observed that the openings 6 in the forward portion 5 of frame 3 are offset upwardly and downwardly from the horizontally extending portion 9 of frame 3 so as to form recessed areas 42 and 43 which are adapted to receive a special form of jack as hereinafter more fully described.

FIGS. 10 to 15 show the frame structure 30 of the embodiment illustrated in FIG. 2 wherein the forward portion 32 is integrally molded with the rearwardly extending portion 33. The face 31 contains holes 44 adapted to receive jacks, pilot lights, switches, or the like, as previously explained, and are offset with respect to the rearwardly extending portion 33 so as to form channels 45 and 46. Internally threaded metal inserts 47 are molded into the rear end of the horizontally extending portion 33 of frame 30 so that electrical contact assemblies can be secured thereto by means of screws in the manner previously explained. Recesses 48 and 49 are provided to receive resilient clips for the purpose of securing the frame member 30 in the opening 29 of panel 28 of FIG. 2 as previously explained in connection with FIG. 1. Frame 30 also contains vertical partition members 50. Vertical partition members 50 serve to separate and insulate electrical contact blades in the contact blade assemblies from one another. The vertical partitions also add strength to frame 30.

FIGS. 16 to 21 show the frame structure 37 of the embodiment illustrated in FIG. 3 wherein the forward portion 38 is integrally molded with the rearwardly extending portion 39. The face 36 contains holes 40 adapted to receive jacks, pilot lights, switches or the like, as previously explained, the holes being offset with respect to the rearwardly extending portion 39 so as to form channels 51. Internally threaded inserts 52 made of metal or other suitable material are molded into the rear end of the horizontally extending portion 39 of frame 37 so that electrical contact assemblies can be secured thereto by means of screws in the manner previously explained. Recesses 53 are provided to receive resilient clips for the purpose of securing the frame member 37 in the opening 35 of panel 34 of FIG. 3 as previously explained in connection with FIG. 1. Frame 37 also contains vertical partitions 54 which serve to separate side-by-side electrical contact assemblies from one another and to increase the strength of the frame.

FIGS. 23 to 27 illustrate a new and improved type of jack element 55 which is formed in one piece from an electrically conducting metal sheet so that the forward end 56 is wrapped around to form a tubular jack 57 adapted to receive an electrical plug and the rear end 58 is flat and contains holes 59 through which screws can be inserted to connect the jack elements to electrical contact blades which extend forwardly over the intermediate portion 60 of the jack element. The intermediate portion 60 consists of a channel which is arcuate and is offset from the tubular portion 57 and also from the end portion 58. Thus, the jack element 55 as shown in FIGS. 23 to 27 can be inserted in the forward openings or holes of any of the modular frame elements 3, 30 or 37 of FIGS. 1, 2 and 3 in the manner illustrated in FIG. 22. As shown, installation of the jack element is effected by inserting the tubular portion 57 in the rear of the holes 61 formed in the forward portion 62 of frame element 63. As the jack element is pressed forwardly and downwardly the intermediate channel portion 60 will fall into recess 64 in frame member 63 and the flat portion 58 will lie adjacent the upper side 65 of the rearwardly extending portion 66 of frame member 63 so that the holes 59 will coincide with the openings 67 which contain internally threaded inserts whereby the jack element 55 can be electrically connected through screws to one or more electrical contact blades or terminals of the type previously illustrated in FIGS. 1, 2 and 3.

This type of jack element when used in conjunction with a modular frame element of the type previously described makes it possible to eliminate the use of individual sleeves which would normally be inserted into the holes in the forward part of the frame element and then connected by brazing to a metal bracket. By forming the jack element in a single piece, the costs of making and assembling the units are substantially reduced.

Figure 28:
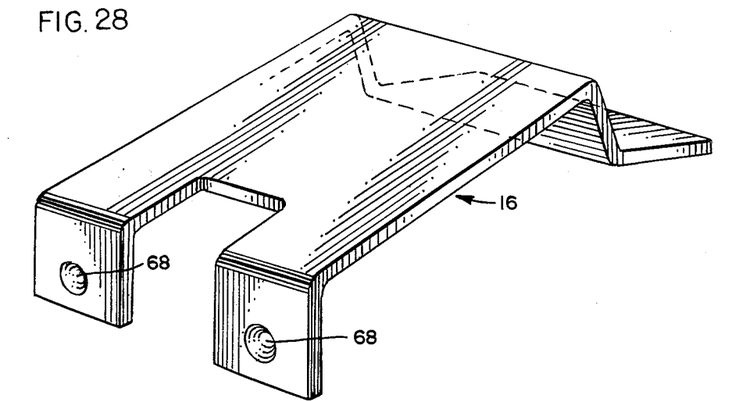
FIG. 28 is a perspective view of a resilient clip adapted to be inserted in the forward end of a modular frame of the type previously described for the purpose of securing said frame to a panel mounting.
Figure 29:
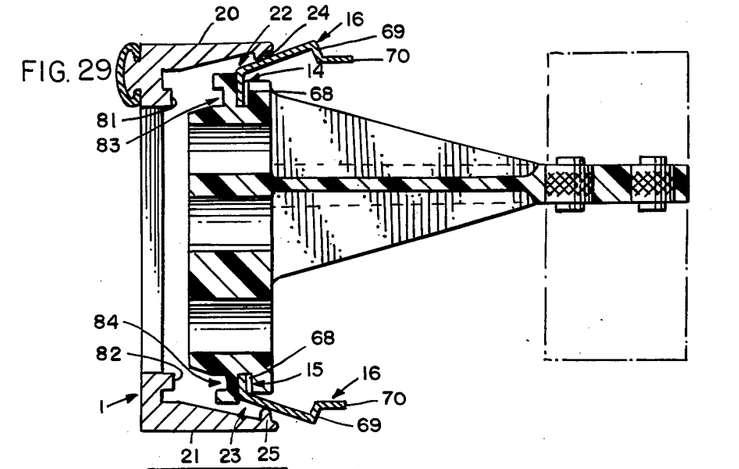
FIG. 29 is a sectional view taken centrally through a panel and a frame to be mounted therein and illustrating the relative positions of said panel and said frame prior to the insertion of the frame in the panel.
Figure 30:
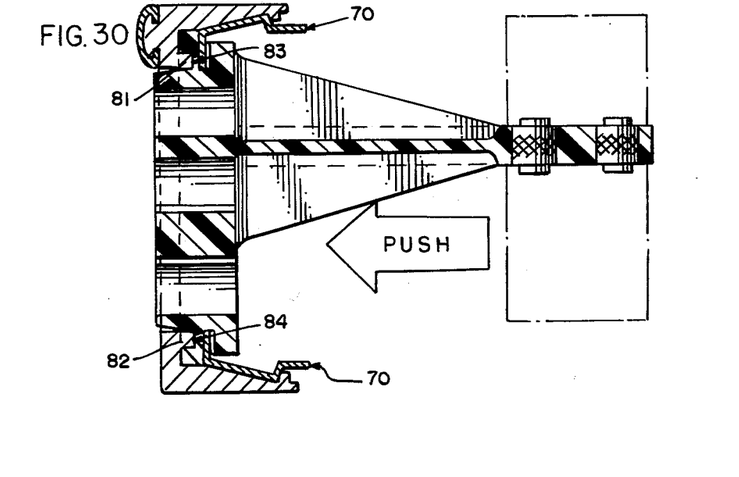
FIG. 30 is a sectional view similar to FIG. 29 but with the contact assembly frame inserted or installed in the panel.

FIGS. 28 to 30 are enlarged views showing in more detail the construction of the resilient clips 16 and 17 which are inserted into recesses in the upper and lower parts of the forward portion of the frame members so that when the frame members containing the clips are pressed forwardly into the rear of the panel the frame members will be locked in place in the panel. As will be seen from FIG. 28 each of the resilient clips or latch members 16 contains an embossment 68 so that when the latch members 16 are pressed into recesses 14 and 15 the embossment 68 will make frictional contact with the sides of the recesses and hold the latch members 16 in place so that they are not easily disengaged from the frame members. The use of an embossment or dimple is optional. The clips can be loosely assembled and will stay in place when assembled into the panels. Also, they can be held frictionally in place by any suitable means, e.g., a press fit, clip slightly bent, or by other means.

Each of the latch members 16 is shaped so as to fit the channels 22 and 23 in the rearwardly extending portions 20 and 21 of panel 1. Each of the latch members 16 also has an inwardly projecting portion 69 and a rearwardly projecting portion 70, the inwardly projecting portion 69 being complementally shaped to fit against the forward portions of projections 24 and 25 with the rearwardly projecting portions 70 extending rearwardly beyond projections 24 and 25 when the frame member is moved from the pre-installation position shown in FIG. 29 to the installation position shown in FIG. 30. After the frame member has been installed as shown in FIG. 30 it can, if desired, be removed again by pressing inwardly on projecting members 70 of resilient latch member 16.

Figure 31:
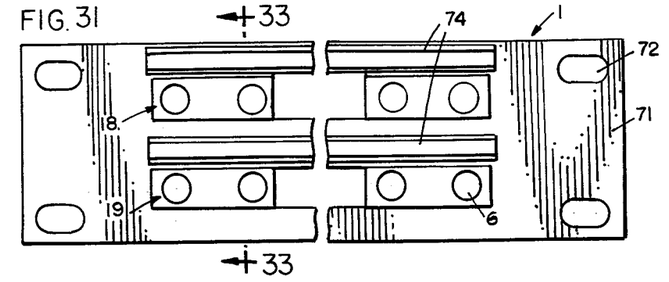
FIG. 31 is a front view of a panel of the type shown in FIG. 1.
Figure 32:
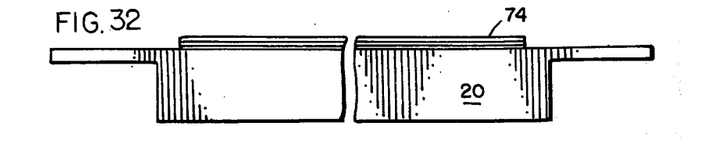
FIG. 32 is a top plan view of a panel of the type shown in FIG. 31.
Figure 33:
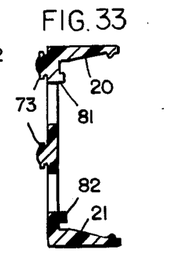
FIG. 33 is a cross sectional view taken through the line 33,33 of FIG. 31.

FIGS. 31 to 33 show an extruded panel made of metal or other suitable material corresponding to the structure of panel 1 in FIG. 1 wherein the rearwardly extending portions 20 and 21 are integrally formed with the front 71 of the panel and holes or openings 72 are provided in order to mount the panel on a suitable superstructure, not shown. The molded panel also contains guide ways 73 which are adapted to receive designation strips 74 (see U.S. Pat. No. 3,597,867).

Figure 34:
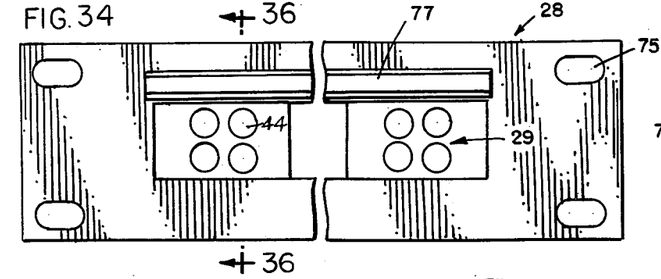
FIG. 34 is a front view of a panel of the type shown in FIG. 2.
Figure 35:
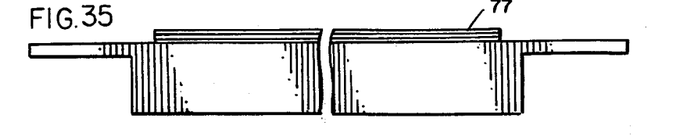
FIG. 35 is a top plan view of the panel shown in FIG. 34.
Figure 36:
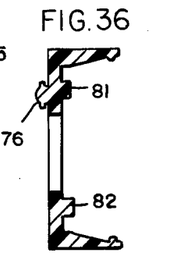
FIG. 36 is a cross sectional view taken along the lines 36,36 of FIG. 34.

FIGS. 34 to 36 show an extruded panel made of metal or other suitable material corresponding to panel 28 in FIG. 2 and containing mounting holes 75 and a molded guide way 76 for a designation strip 77.

Figure 37:
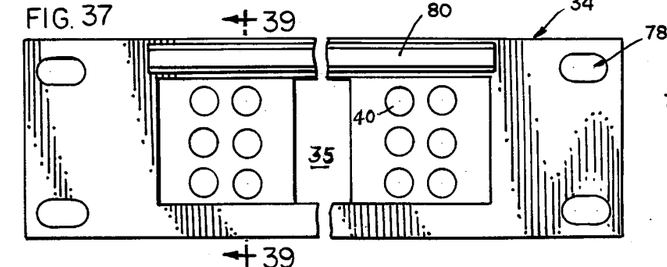
FIG. 37 is a front view of the panel shown in FIG. 3.
Figure 38:
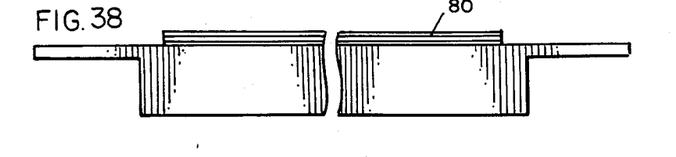
FIG. 38 is a top plan view of the panel shown in FIG. 37.
Figure 39:
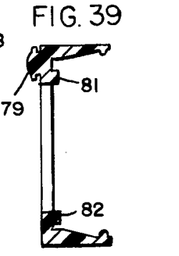
FIG. 39 is a sectional view taken along the line 39,39 of FIG. 37.

FIGS. 37 to 39 show an extruded panel made of metal or other suitable material corresponding to the panel 34 in FIG. 3 wherein mounting holes 78 are provided and guide way 79 is integrally molded to accommodate a designation strip 80.

Each of these panels has upper and lower inwardly projecting ribs 81 and 82 which engage mating recesses 83 and 84 in the modules when the modules and the panels are combined (See FIGS. 29 and 30). These complementary ribs and recesses are very effective in preventing bowing of the panels due to the outward tension of the retaining clips. When bowing occurs, the modules are no longer securely latched.

Figures 4, 5, 6, 7, 8, 9:
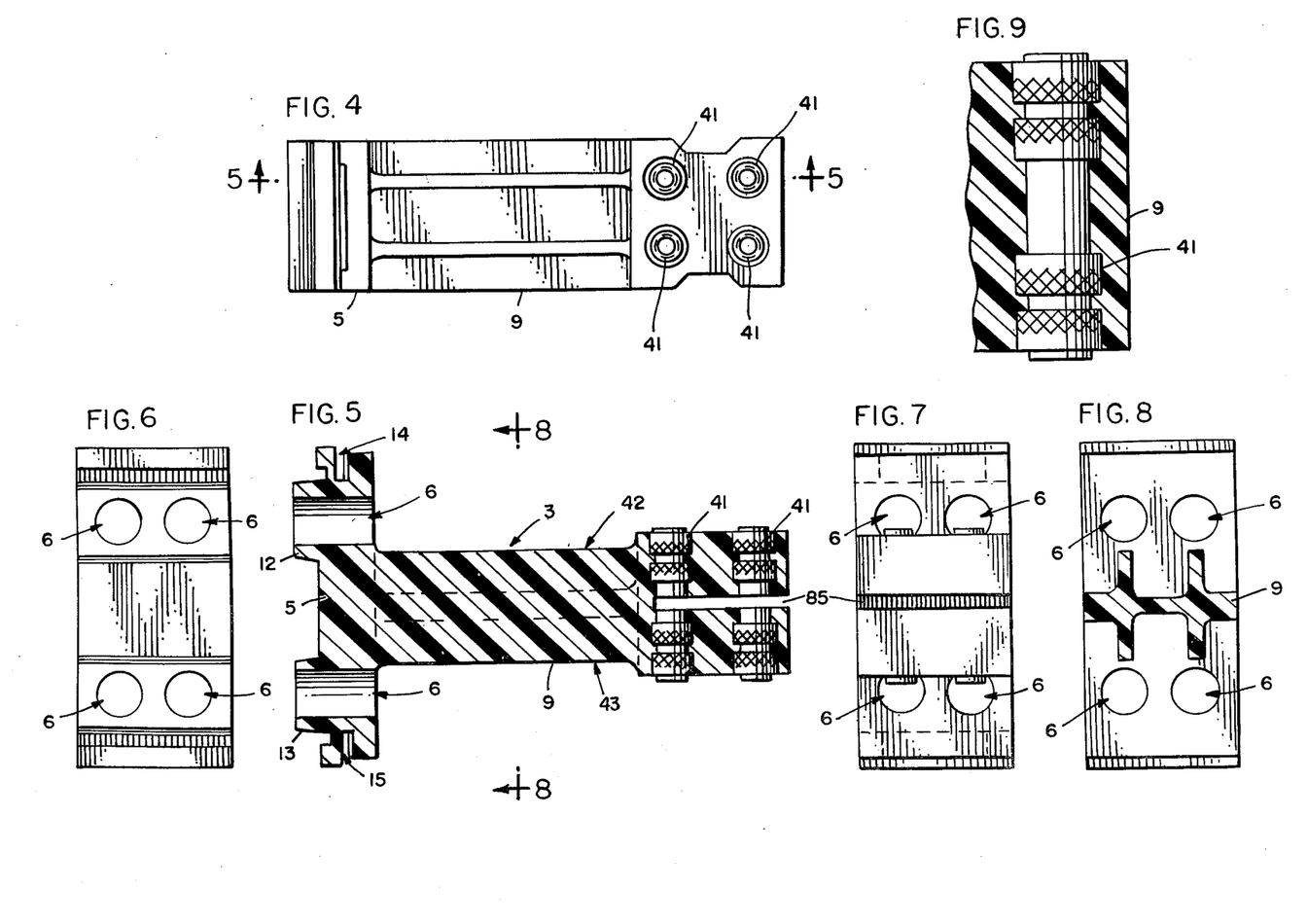
FIG. 4 is a plan view of the modular frame employed to support the electrical contact assemblies shown in FIG. 1.
FIG. 5 is a vertical sectional view taken along the line 5,5 of FIG. 4.
FIG. 6 is an end view of the modular frame shown in FIGS. 4 and 5.
FIG. 7 is a rear end view of the modular frame shown in FIGS. 4 and 5.
FIG. 8 is a cross sectional view taken along the line 8,8 of FIG. 5.
FIG. 9 is an enlarged detail view showing an internally threaded metal insert normally disposed in the rear end of the frame shown in FIGS. 4 and 5 for the purpose of securing electrical contact assemblies thereto.
Figure 10:
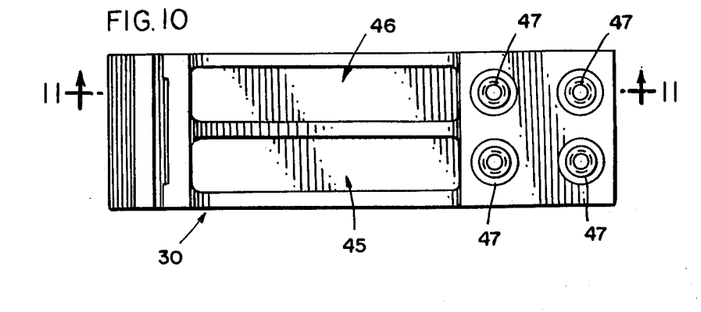
FIG. 10 is a plan view of a different type of modular frame used for supporting electrical contact assemblies as shown in FIG. 2.
Figures 11, 12:
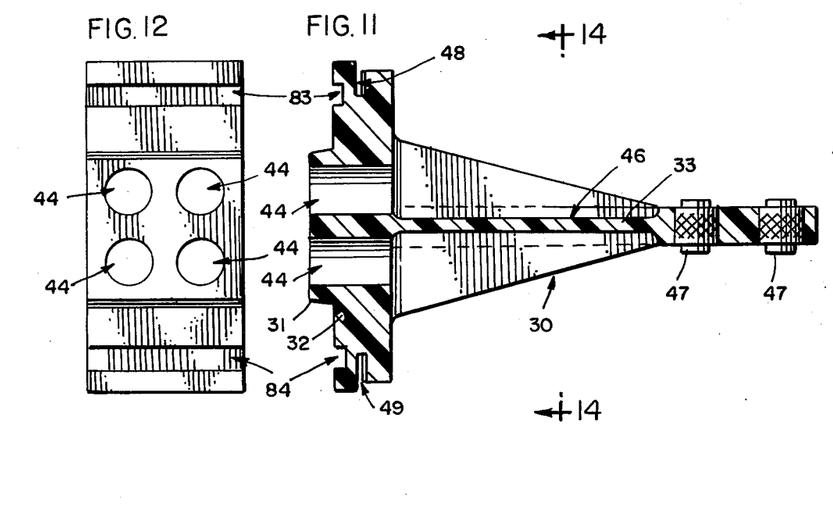
FIG. 11 is a sectional view taken along the line 11,11 of FIG. 10.
FIG. 12 is a front end view of the modular frame shown in FIGS. 10 and 11.
Figure 13:
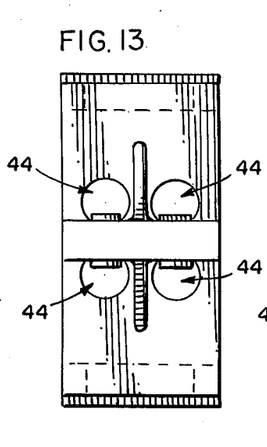
FIG. 13 is a rear end view of the modular frame shown in FIGS. 10 and 11.
Figure 14:
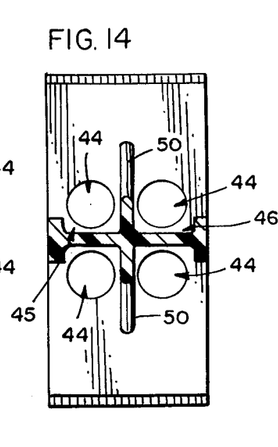
FIG. 14 is a sectional view taken along the line 14,14 of FIG. 11.
Figure 15:
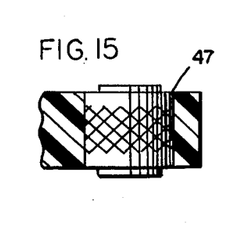
FIG. 15 is an enlarged detail view of an internally threaded metal insert which is embedded in the rear portion of the frame as shown in FIGS. 10 and 11 for the purpose of securing electrical contact assemblies thereto.
Figure 16:
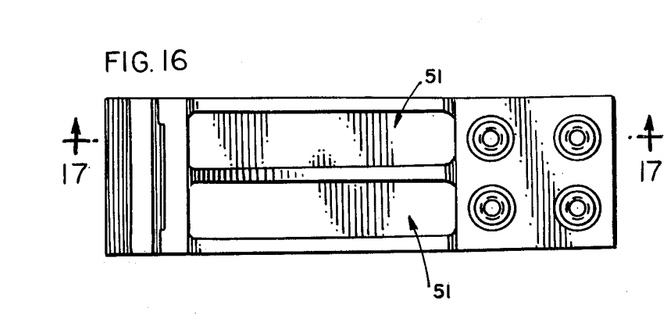
FIG. 16 is a plan view of a different type frame as shown in FIG. 3.
Figure 17:
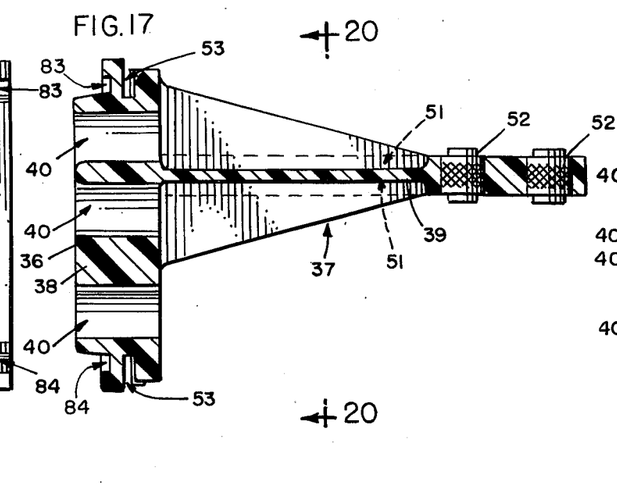
FIG. 17 is a sectional view taken along the line 17,17 of FIG. 16.
Figure 18:
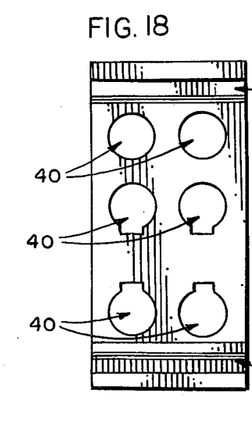
FIG. 18 is a front view of the modular frame shown in FIGS. 16 and 17.
Figures 19, 20:
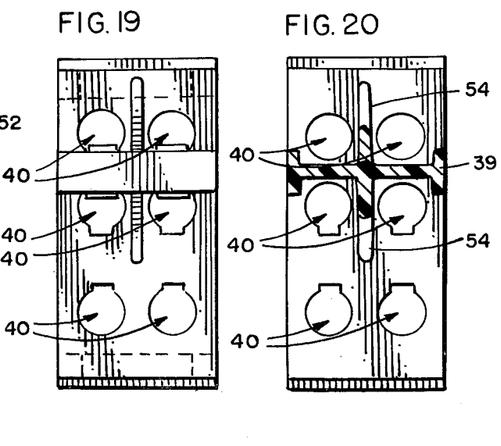
FIG. 19 is a rear view of the modular frame shown in FIGS. 16 and 17.
FIG. 20 is a sectional view taken along the line 20,20 of FIG. 17.
Figure 21:
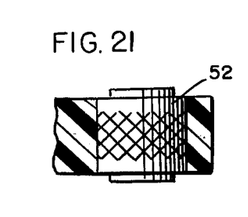
FIG. 21 is an enlarged detail view of an internally threaded metal insert which is molded into the frame shown in FIGS. 16 and 17 in order to provide means for securing electrical contact blade assemblies to said frame.
Figures 22, 23A, 23B:
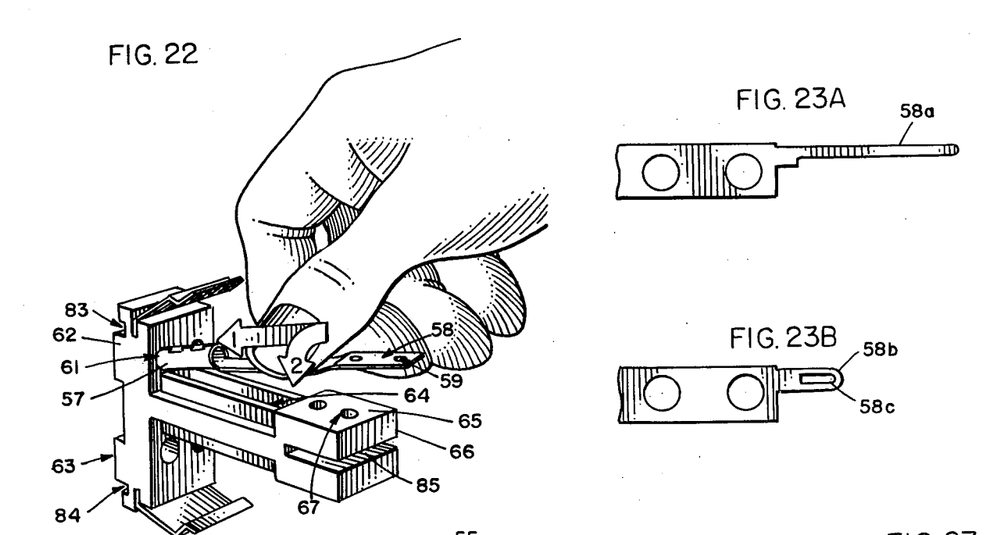
FIG. 22 is a perspective view of a modular frame illustrating the manner in which a special type of jack is mounted in said frame.
FIGS. 23A and 23B show integral lugs on the jack of FIG. 23 for painted circuit and solder terminal connections, respectively.
Figures 23, 24, 25, 26, 27:
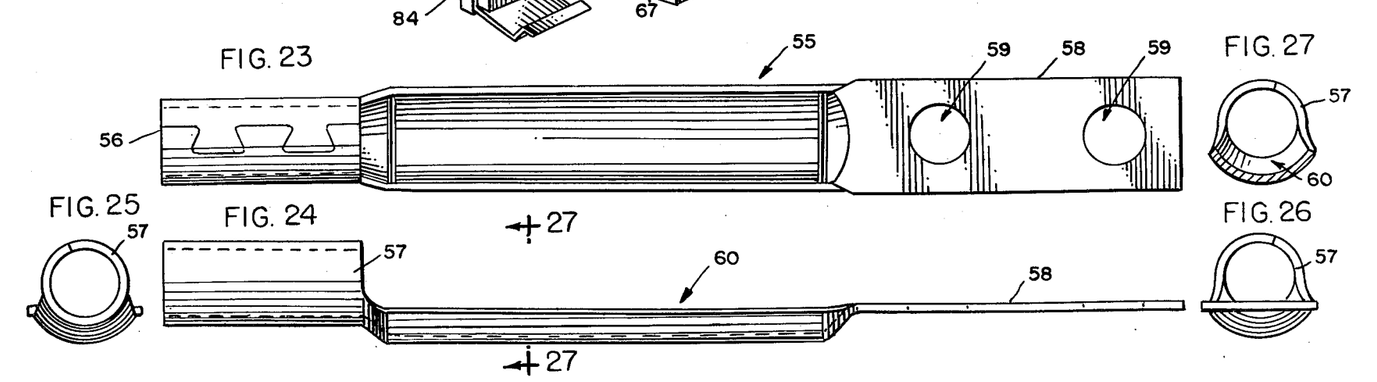
FIG. 23 is a plan view illustrating a special type of jack made from a wrapped up stamping which can be mounted in a modular frame as shown in FIG. 22.
FIG. 24 is a side elevational view of the jack shown in FIG. 23.
FIG. 25 is a front end view of the jack shown in FIGS. 23 and 24.
FIG. 26 is a rear end view of the jack shown in FIGS. 23 and 24.
FIG. 27 is a sectional view taken along the line 27,27 of FIG. 24.

Another feature of the invention is the provision of cut slots 85 at the rear of the modules as shown in FIGS. 5, 7 and 22. The threaded inserts 52 are molded into the jack frames when the modules are formed from a suitable electrically insulating moldable material and the slots 85 split and separate the threaded inserts and isolate the sleeve circuits electrically.

The rear end 58 of jack element 55 can have an integrally formed lug 58a as shown in FIG. 23A which provides a terminal that can be electrically connected to a printed circuit, or an integrally formed lug 58b as shown in FIG. 23B having a hole therein 58c which can be used as a solder connection to an electrical circuit.

Figure 44:
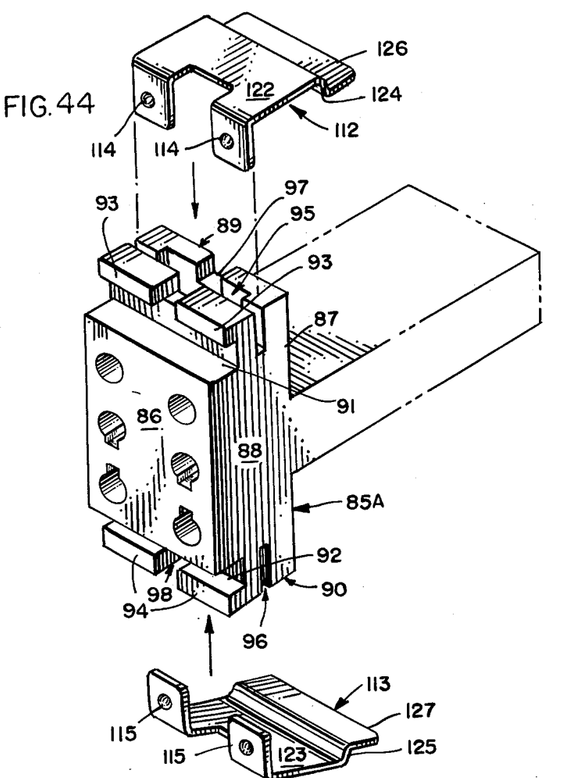
FIG. 44 is a perspective view showing the forward portion of the modular jack frame illustrated in FIGS. 42 and 43 with the rearwardly extending portion in phantom and the resilient clips in an exploded view.
Figure 45:
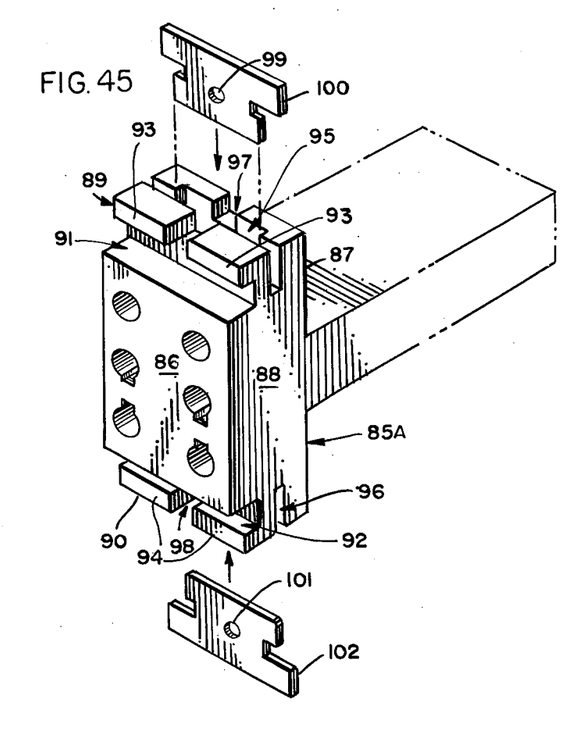
FIG. 45 is a perspective view of the forward portion of the modular jack frame with the rearwardly extending portion in phantom, illustrating means for securing the modular jack frame to a panel as shown in FIGS. 40 and 41.

FIGS. 44 and 45 illustrate modifications of the modular jack frame structure wherein the forward portion 85A is generally rectangular and has a front face 86, a rear face 87, side faces 88, a top 89 and a bottom 90. The front face is smooth and is adapted to fit into an opening in a panel. Recesses 91 and 92 provided which are adapted to receive rearwardly projecting portions of a panel. The front of the top portions 89 are offset inwardly at 93 and the front of the bottom portions 90 are offset inwardly at 94 so that the front face 86 can project through an opening in a panel.

Figures 40, 41, 42, 43:
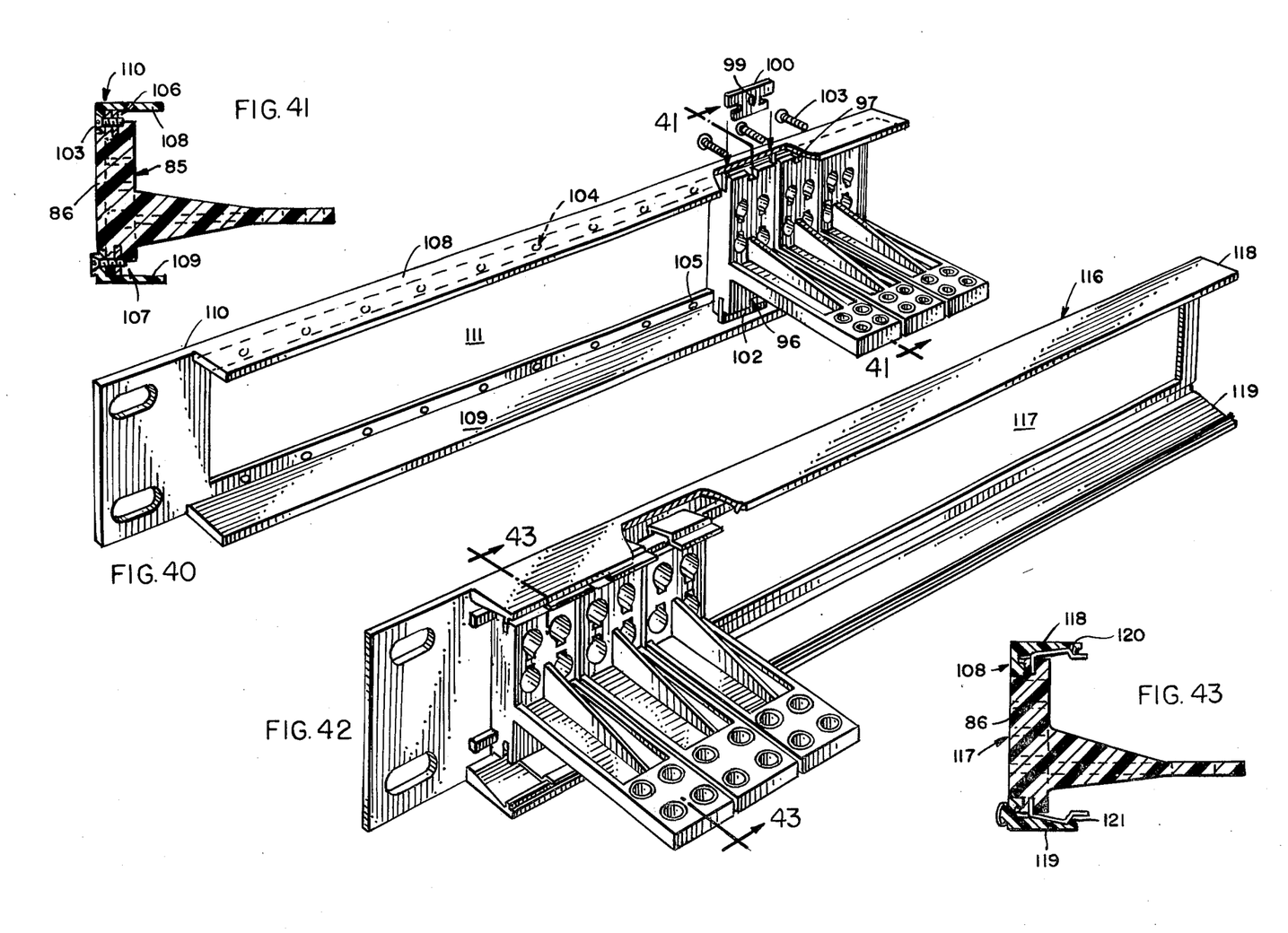
FIG. 40 is a perspective view with a partial section and an exploded view showing a modular modified form of modular jack frame in a panel using screws.
FIG. 41 is a cross sectional view taken along the lines 41,41 of FIG. 40 showing the cross section of the panel-mounted modular jack frame.
FIG. 42 is a perspective view partly in section showing a plurality of modular jack frames of the present invention mounted in a panel by the use of resilient clips which are in turn mounted in slots open outwardly and extending transversely in the top and in the bottom of the forward porton of the modular jack frame.
FIG. 43 is a cross sectional view taken along the lines 43,43 of FIG. 42.

A slot 95 which is open outwardly extends transversely in the top of the forward portion 85A and a similar slot 96 extends transversely in the bottom of the forward portion 85A. A second slot 97 extends from front to rear perpendicular to slot 95 in the top of forward portion 85A and a second slot 98 extends perpendicular to slot 96 in the lower part of the forward portion 85A. The slots 97 are preferably centrally located and are aligned with an opening or hole 99 in member 100. Similarly the slots 98 are preferably centrally located and are aligned with an opening or hole 101 in member 102. The members 100 and 102 are adapted to be inserted, respectively, in the transverse slots 95 and 96 so that the holes 99 and 101 are aligned with slots 97 and 98. The holes 99 and 101 are internally threaded and are adapted to receive screws 103 which are inserted through holes 104 in the front of the panel as shown in FIGS. 40 and 41. In a similar manner, member 102 secures the bottom of the front portion of the module to a panel by insertion of screws through holes 105 in the front of the panel so that the threads on said screws engage the internally threaded opening 101 of member 102. The outer extremities of members 100 and 102 normally project slightly above and below the top and bottom of the forward portions of the modules so as to project into the free spaces 106 and 107 between the inner surfaces of the rearwardly extending portions 108 and 109 of the panel 110 and the top of the module, as shown in FIG. 41. The face 86 of the module projects into the panel opening 111 and is substantially flush with the outer surface of the panel 110.

In the embodiment of the modular jack frame shown in FIG. 44 resilient clips 112 and 113 are inserted into the transverse slots 95 and 96, respectively, so that the embossments 114 in clip 112 engage the inner sides of slot 95 and the embossments 115 in clip 113 engage the inner sides of slot 96.

Thus, by the arrangement of transverse and perpendicular slots on the top and bottom of the front portion of the modular jack frame, it is possible to secure the jack frame in a panel, either by means of screws or by means of resilient clips without using screws. When resilient clips are used the combination of the panel and the modular jack frame or a plurality of modular jack frames is similar to that previously explained and as further shown in FIGS. 42 and 43 wherein the panel 116 has a front opening 117 and rearwardly extending members 118 and 119.

The rearwardly extending members 118 and 119 have inner surfaces which slope outwardly, and then inwardly at 120 and 121. These surfaces are adapted to receive the area 122 of clip 112 and the area 123 of clip 113. The clip 112 has an inwardly projecting surface 124 and the clip 113 has an inwardly projecting surface 125. These surfaces 124 and 125 are adapted to engage the inner portions of projections 120 and 121 of the panel. The clip 112 has a rearwardly projecting area 126 and the clip 113 has a rearwardly projecting area 127 which extend beyond the rearwardly projecting portions 118 and 119 of panel 116, thereby making it possible to grasp the ends of rearwardly projecting portions 126 and 127 or to press them inwardly, or to use a tool to press them inwardly, so as to disengage the clips 112 and 113 and the module associated therewith from the panel 116.

The invention is advantageous not only in providing new and improved frame structures for jacks and the like wherein the entire frame is a molded rigid frame made from plastic or other suitable electrically insulating material having a forward portion adapted to be panel mounted and a rearward portion adapted to receive electrical contact assemblies, but also in providing modular jack structures having means for mounting them in close side-by-side relationship in a panel, either with or without screws.

As shown by the various embodiments of FIGS. 1, 2 and 3, these frame structures are quite versatile so that by using three different types of frames it is possible to make a single jack structure as shown in FIG. 1, a twin-jack structure as shown in FIG. 2, or a tri-jack structure as shown in FIG. 3. Also, by using a special type of jack element as described with respect to FIGS. 22 to 27 the manufacture of these devices is simplified and the costs are reduced. It will be understood that the contact assemblies which are carried by the various types of frames can be used not only with connections for plugs that are inserted into jacks but also for other types of inserts in the openings in the forward part of the frame structures such as pilot lights, or switches, which project through such openings and make electrical contact with the electrical contact assemblies carried by the frame element.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A modular jack frame structure for electrical connections adapted to be secured in an opening in a panel comprising a molded rigid frame formed from an electrically insulating material, said frame having a forward rectangular portion of substantial thickness, said forward portion having a front face, a rear face, a top and a bottom with one or more holes therein extending from the front face to the rear face and a rearward portion carrying one or more electrical contact assemblies adapted to be electrically connected to electrically conducting means inserted into said holes, the front face of said forward portion being adapted to fit into an opening in a panel, first slots open outwardly and extending transversely from side to side within the top and within the bottom of said forward portion to receive means for fastening said jack frame in an opening in a panel, second slots open outwardly and extending perpendicularly to said first slots from front to rear within the top and within the bottom of said forward portion to receive alternate means for fastening said jack frame in an opening in a panel, and means engaging one or more of said slots to secure said modular jack frame in an opening in a panel.

2. A modular structure as claimed in claim 1 in which said transverse slots within the top and bottom of said forward portion contain elongated resilient clips having one end thereof mounted in said transverse slots and the opposite end free, the intermediate portions of said clips being adapted to engage inner surfaces of upper and lower rearwardly extending portions of a mounting panel and the free ends being sufficiently long to extend beyond the rear ends of said upper and lower rearwardly extending ends of said mounting panel.

3. A structure as claimed in claim 2 in which said ends of said clips mounted in said transverse slots contain an embossment effective to anchor said ends in said slots.

4. A modular structure as claimed in claim 1 in which each of said transverse slots contains an insert member projecting outwardly therefrom and having an internally threaded hole extending from front to rear thereof and aligned with said slot which extends from the front to rear of said forward portions of said modular structure, said front to rear slot and said hole being adapted to receive a screw inserted into the front of a panel thereby to secure said modular structure to a panel.

5. In combination, a panel having an opening therein and a modular frame structure as claimed in claim 1 mounted in said opening and retained therein by means associated with one or more of said slots in said forward portion of said modular structure.

6. A combination as claimed in claim 5 in which said last named means comprises a pair of resilient clips.

7. A combination as claimed in claim 5 in which said last named means comprises screws passing from the front of said panel through said front to rear slots of said forward portion of said modular frame structure to threaded holes in an insert member in said transverse slots.

8. A combination as claimed in claim 5 in which said panel is formed as a single piece and comprises upper and lower rearwardly extending portions parallel to one another and perpendicular to the face of said panel the inner surfaces of which engage said last named means.

9. A combination as claimed in claim 5 in which the rear side of the front of said panel and the front side of said modular frame structure contain upper and lower interfitting complemental projections and recesses adapted to prevent bowing of said panel when said panel and said frame structure are combined.

10. A frame structure for electrical connections comprising a molded rigid frame formed from an electrically insulating material, said frame having a vertically extending porion and a horizontally extending portion perpendicularly united with the rear face of the vertically extending portion intermediate the upper and lower ends of the rear face of the vertically extending portion, said vertically extending portion containing holes extending from front to rear thereof, said horizontally extending portion carrying one or more electrical contact assemblies adapted to receive an electrical conductor inserted through one or more of said holes in said vertically extending portion, one or more of said holes in said certically extending portion of said frame structure containing a jack sleeve having a tubular forward portion which is inserted in at least one of said holes and an elongated rearwardly extending portion of said jack sleeve supported on its underside by said horizontally extending portion of said frame and connected at its rear end to said contact assembly, said tubular portion of said jack sleeve being offset from the horizontal adjacent the rear end of said tubular portion with respect to said elongated rearwardly extending portion of said jack sleeve, said elongated rearwardly extending portion of said frame containing a rearwardly extending channel offset from said one hole horizontally, said rearwardly extending portion of said jack sleeve being seated in and retained by said channel, whereby when said tubular forward portion is inserted into a said hole in said vertical portion from the rear it extends from front to rear of said hole and its said rearwardly extending portion, which is offset horizontally from said forward portion, extends along and is supported by said horizontal channel portion of said frame, thereby serving to anchor said forward tubular portion.

11. A frame structure as claimed in claim 10 in which said jack sleeve has a second offset portion adjacent the end opposite the tubular end, said second offset portion being connected to said frame.

12. A frame structure for electrical connections comprising a molded rigid frame formed from an electrically insulating material, said frame having a vertically extending portion and a horizontally extending portion perpendicularly united with the rear face of the vertically extending portion intermediate the upper and lower ends of the rear face of the vertically extending portion, said vertically extending portion containing holes extending from front to rear thereof, said horizontally extending portion carrying one or more electrical contact assemblies adapted to receive an electrical conductor inserted through one or more of said holes in said vertically extending portion, one or more of said holes in said vertically extending portion of said frame structure containing a jack sleeve havng a tubular forward portion which is inserted in at least one of said holes and an elongated rearwardly extending portion of said jack sleeve supported on its underside by said horizontally extending portion of said frame, said tubular portion of said jack sleeve being offset from the horizontal adjacent the rear end of said tubular portion with respect to said elongated rearwardly extending portion of said jack sleeve, and said horizontally extending portion of said frame containing adjacent the end carrying said electrical contact assemblies one or more internally threaded inserts embedded therein and adapted to receive screws for fastening said contact assemblies in place.

13. A frame structure as claimed in claim 12 in which said portion of said frame carrying said inserts contains a slot separating two or more said inserts from one another.

* * * * *

UNITED STATES PATENT AND TRADEMARK OFFICE
CERTIFICATE OF CORRECTION

PATENT NO. :  4,073,563
DATED      :  February 14, 1978
INVENTOR(S):  JAMES R. BAILEY and VERNON W. LAVIGNE It is certified that error appears in the above-identified patent and that said Letters Patent are hereby corrected as shown below:

Column 4, line 51, "openings" should read --opening--.

Column 7, line 36, after "92" insert --are--.

Column 10, line 22, "certically" should read --vertically--.

Signed and Sealed this

Sixth Day of June 1978

[SEAL]

Attest:

RUTH C. MASON
*Attesting Officer*

DONALD W. BANNER
*Commissioner of Patents and Trademarks*